United States Patent [19]
Carreira

[11] 3,800,302
[45] Mar. 26, 1974

[54] RECORDING OSCILLOGRAPH UTILIZING PHOTOELECTROPHORETIC TECHNIQUES

[75] Inventor: Leonard M. Carreira, Penfield, N.Y.

[73] Assignee: Xerox Corporation, Rochester, N.Y.

[22] Filed: Dec. 27, 1971

[21] Appl. No.: 212,651

[52] U.S. Cl. .................. 346/109, 346/46, 346/74 P
[51] Int. Cl. .................... G01d 15/06, G03g 13/18
[58] Field of Search ...... 179/100.3 K; 346/46, 74 P, 346/74 ES, 109; 96/88

[56] References Cited
UNITED STATES PATENTS

| | | | |
|---|---|---|---|
| 3,295,142 | 12/1966 | Slavens | 346/46 |
| 3,363,258 | 1/1968 | Bogs et al. | 346/46 |
| 3,401,400 | 9/1968 | Lindsey | 346/46 |
| 3,409,899 | 11/1968 | Cowan et al. | 346/74 P |
| 3,426,353 | 2/1969 | Thorburn | 346/46 |
| 3,508,477 | 4/1970 | Groo | 346/74 ES |
| 3,609,031 | 9/1971 | Kinoshita et al. | 346/74 ES |

*Primary Examiner*—Paul J. Henon
*Assistant Examiner*—Michael Sachs

[57] ABSTRACT

A multi-channel photorecording oscillograph comprises a means for transporting a polychromatic photoelectrophoretic recording medium in a predetermined direction through a recording station of the oscillograph and a means for projecting toward said medium at the recording station a plurality of different colored light beams thereby exposing the transported medium to a plurality of different colored light beams and forming color distinguishable traces thereon. This latter means includes an equal plurality of sensitive galvanometer coils each having a reflective body operatively coupled thereto for movement therewith and arranged for reflecting a light beam which is incident thereon and causing deflection of the light beam across the record medium in a direction generally normal to the direction of transport of the medium in accordance with the amplitude of an electrical signal which is applied to the coil. Means are provided for developing the exposed photoelectrophoretic recording medium in order to provide a record of signal amplitude variations of the plurality of signals over an interval of time. With this arrangement each trace is formed of a distinctive color thereby rendering the traces associated with particular channels readily discernible.

1 Claim, 3 Drawing Figures

PATENTED MAR 26 1974 3,800,302

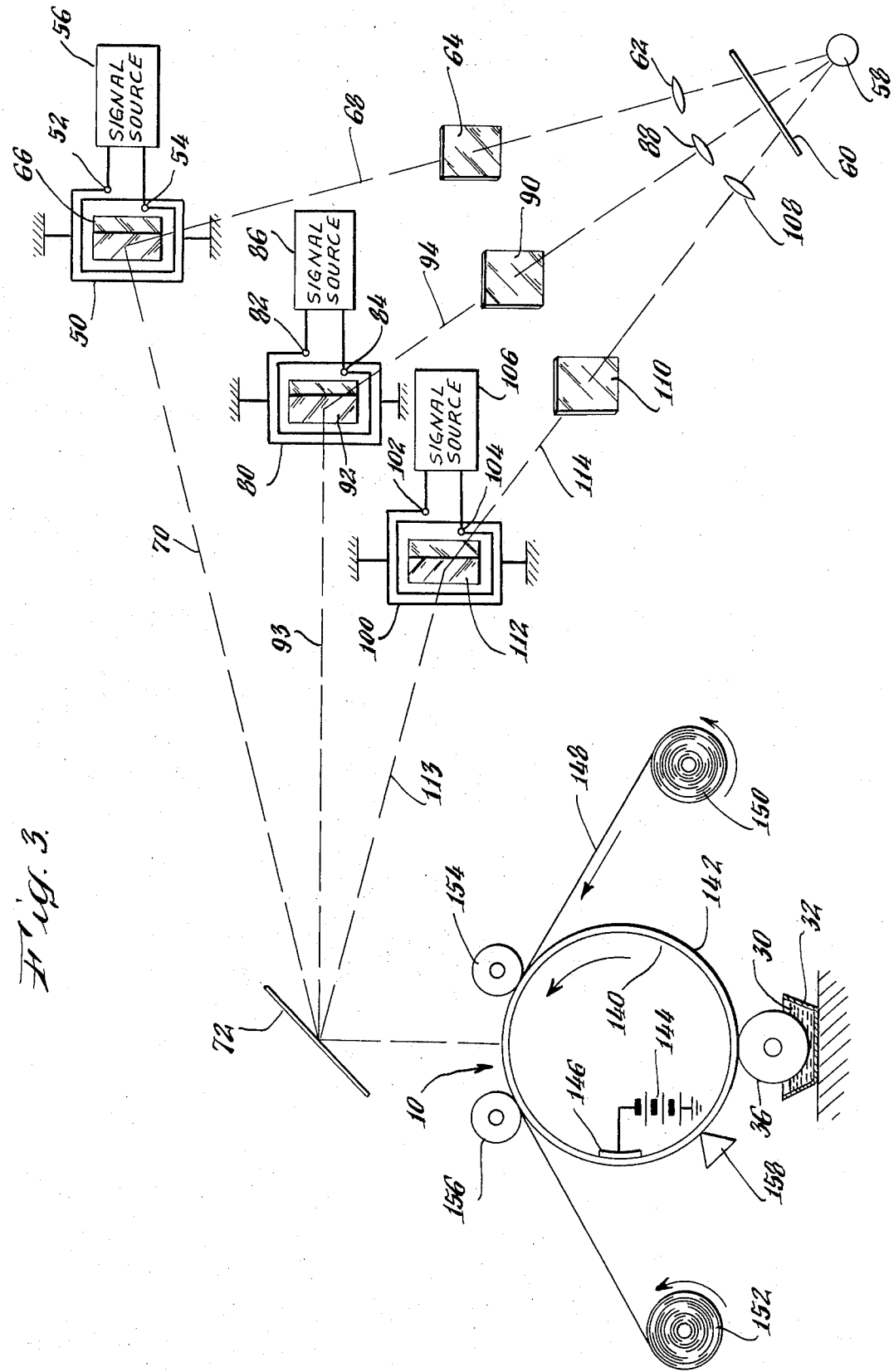

RECORDING OSCILLOGRAPH UTILIZING PHOTOELECTROPHORETIC TECHNIQUES

This invention relates to recording oscillographs. The invention relates more particularly to improvements in multi-channel photorecording oscillographs.

A photorecording oscillograph is an instrument which provides a record of electrical signal amplitude variations occurring over an interval of time. The signal variations to be recorded represent, for example, the output of a pickup sensor or transducer which sense variations in physical quantities. This oscillograph which is noted for relatively high sensitivity, includes means for projecting a relatively narrow beam of light toward a reflective body. The reflective body is operatively coupled to a sensitive galvanometer coil and reflects the incident beam of light toward a moving photosensitive record medium. An amplitude varying electrical signal is applied to the coil and causes displacement of the coil and thus the light beam across the record medium by an amount proportional to the amplitude of the applied electrical signal. A resulting trace of the light beam along the record medium is thereby developed to provide a record of the signal variations occurring over an interval of time.

It is often desirable to record the amplitude variations of a number of electrical signals which occur simultaneously in time. To this end, multi-channel photorecording oscillographs have been provided in which each channel includes a galvanometer coil having a reflective surface operatively coupled thereto for reflecting incident light toward the photosensitive record medium. A plurality of light beams are thus traced across the moving record medium in accordance with the variations in amplitude of the signals coupled to associated galvanometer coils.

Although the multi-channel photorecording oscillograph has provided useful service, the techniques employed with this instrument have rendered analysis of the recorded signals a relatively difficult task. Many overlapping traces are formed on a single photosensitive recording medium by the various light beams responding to associated electrical signals. Distinguishing between the different traces and associating the different traces with particular signal channels is a time consuming task and at times the various traces cannot be resolved.

Accordingly, it is an object of this invention to provide an improved form of a photorecording oscillograph.

Another object of this invention is to provide an improved form of multi-channel photorecording oscillograph.

Another object of the invention is to provide a multi-channel photorecording oscillograph wherein the traces for individual channels are readily distinguishable.

Another object of the invention is to provide a real time read-out for data recorded by a multi-channel photorecording oscillograph.

In a photoelectrophoretic imaging process, an image is produced by depositing a suspension of photosensitive pigmented particles in an insulating liquid between injecting and blocking electrodes. These particles are exposed to light in accordance with a desired image configuration while an electric field is simultaneously established between the electrodes. The exposed pigmented particles migrate through the insulating liquid toward a receiving surface of the blocking electrode and adhere to the receiving surface forming a negative image thereon. The receiving surface is then removed leaving behind a positive pigment image on the surface of the injection electrode. A positive image remaining on the injection electrode can be fixed on the electrode or alternatively the positive image can be transferred to, and fixed on, another receiving surface. A transfer to another surface may be effected with an adhesive pickoff for example, or, it can preferably be accomplished with electrostatic field transfer techniques. Electrostatic field transfer to another surface is provided subsequent to the above described imaging step by introducing an intermediate receiving surface between the electrodes and reapplying a potential which is of opposite polarity to that employed during the imaging step.

Reproduction of an image in color in a photoelectrophoretic process is provided by employing different colored photosensitive pigmented particles which exhibit desired spectral responses and by exposing the material to an image configuration in color. In an exemplary arrangement, the pigmented particles may comprise a mixture of magenta, cyan, and yellow colored particles. A polychromatic photoelectrophoretic imaging system of this type is described in U. S. Pat. No. 3,384,488, the disclosure which is incorporated herein by reference.

When a polychrome imaging suspension is made up of, for example, yellow, cyan and magenta pigments, the mixture appears dark brown or black. When the suspension is exposed to yellow light, the magenta and cyan particles will migrate to the blocking electrode leaving a yellow trace on a dark brown or black background in the injecting electrode. Since the blocking electrode may have, for example, a white paper receiver sheet on it, it may be preferred to use the image formed thereon remembering that the color of the image on the blocking electrode is complementary to the one formed on the injecting electrode. In the above example then, the yellow trace would appear as a blue line on the white paper.

Further, it is not necessary to use a subtractive color imaging system. For example, an additive system using particles such as shown in the Kaprelian U. S. Pat. No. 2,940,847 might be used. All that is necessary is that the system be capable of color separation. To do this, the only requirement is that the particles do not have substantial overlap in spectral response.

In accordance with the features of the present invention, a multi-channel photorecording oscillograph comprises a means for transporting a polychromatic photoelectrophoretic recording medium in a predetermined direction through a recording station of the oscillograph and a means for projecting toward said medium at the recording station a plurality of different colored light beams thereby exposing the transported medium to a plurality of different colored light beams and forming color distinguishable traces thereon. This latter means includes an equal plurality of sensitive galvanometer coils each having a reflective body operatively coupled thereto for movement therewith and arranged for reflecting a light beam which is incident thereon and causing deflection of the light beam across the record medium in a direction generally normal to the direction of transport of the medium in accordance with the amplitude of an electrical signal which is applied to the coil. Means are provided for developing the exposed photoelectrophoretic recording medium in order to provide a record of signal amplitude variations of the plurality of signals over an interval of time. With this arrangement each trace is formed of a distinctive color thereby rendering the traces associated with particular channels readily discernible.

These and other objects and features of the invention will become apparent with reference to the following specification and to the drawings wherein.

Figure 1:
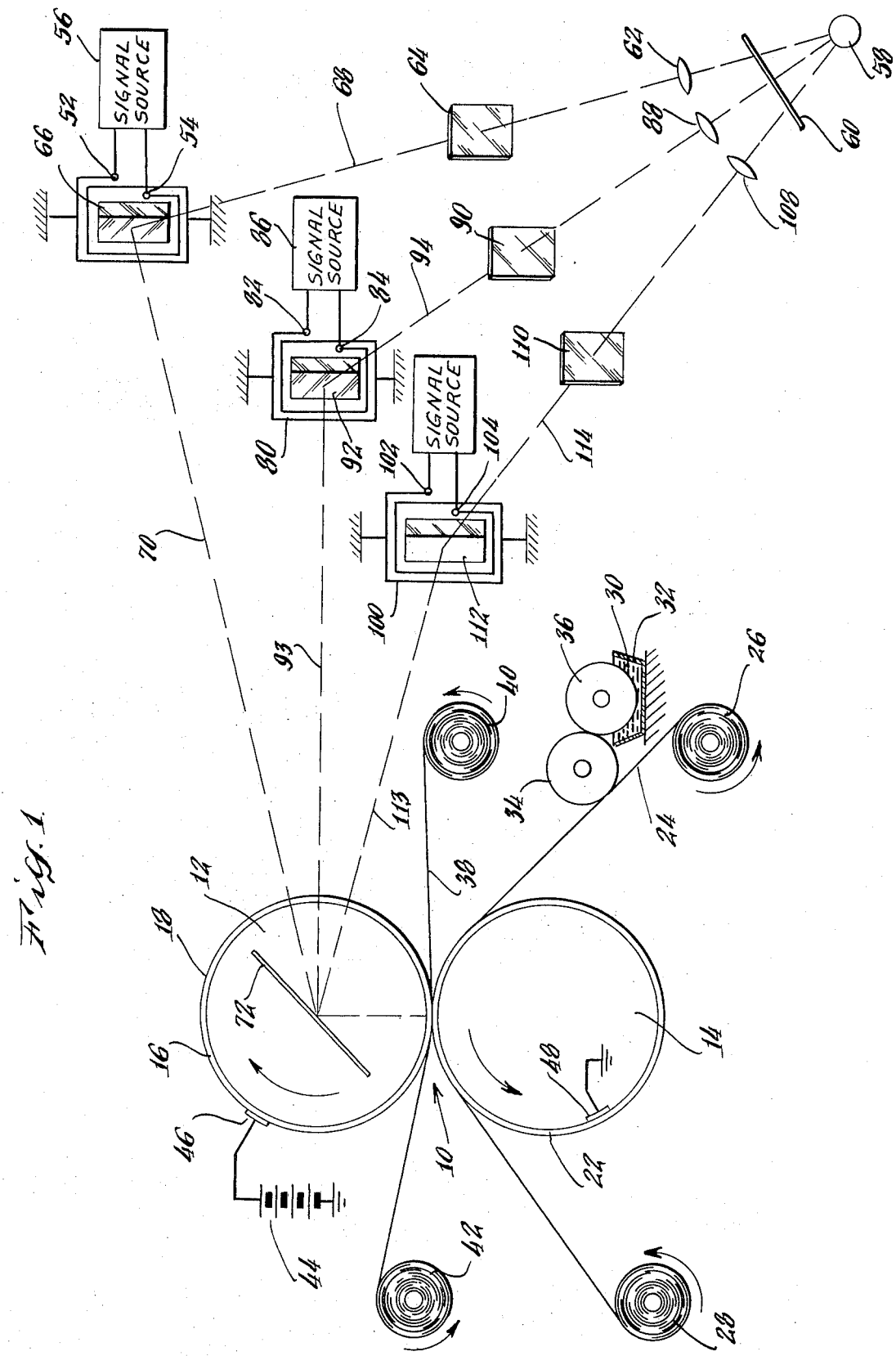
FIG. 1 is a schematic view of a multi-channel oscillograph constructed in accordance with features of this invention.

Referring now to FIG. 1, a recording station 10 is formed at the junction of a cylindrically shaped body 12 and a cylindrically shaped body 14. The body 12 is formed of a layer of optically transparent glass 16 which is coated with a thin surface 18 of an optically transparent layer of conductive material such as tin oxide. Tin oxide coated glass of this nature is commercially available under the trade name "NESA" glass. The body 14 comprises a drum having a conductive central core 20 and a layer of material 22 which is deposited on the core 20 and which is formed of an electrical insulation material. A detailed description of the types of insulation material which are suitable as blocking layers may be found in U. S. Pat. No. 3,383,993.

A polychromatic photoelectrophoretic recording medium is tranported to the recording station 10 by a continuous strip of Mylar tape 24 which is fed from a reel 26, drawn along the surface of the drum 20, between the bodies 12 and 14 and taken up by a reel 28. One surface of the tape 24 is coated with a polychromatic photoelectrophoretic material 30 which is contained in a reservoir 32. This material is deposited on the tape 24 by an applicator roller 34 which in turn is coated by a transport roller 36. The transport roller 36 is partially in contact with the material 30 in the reservoir 32. The polychromatic photoelectrophoretic material 30 comprises a suspension of polychromatic photosensitive particles in an insulating carrier liquid. Typical polychromatic photoresponsive materials include substituted and unsubstituted organic pigments such as phthalocyanines such as Monarch Blue G the beta crystalline form of copper phthalocyanine available from Hercules Inc., quinacridones such as quindo magenta available from Harmon colors, and Monastral Red B available from Du Pont, an azo pigment such as Watchung Red B available from Du Pont and anthraquinones such as Algol Yellow G.C. available from General Dye stuffs. A more complete list of suitable photosensitive pigments is described in the aforementioned U. S. Pat. No. 3,384,488. Typical insulating liquids include decane, dodecane, tetradecane, Sohio Solvent 3440 a kerosene fraction available from Standard Oil Company of Ohio. An optically transparent, electrically conductive strip of tape 38 is fed from a roller 40, drawn along the surface of the body 12 in contact with the suspension 30 on tape 24 and is taken up by a roller 42. The tape 38 may, for example, comprise a thin sheet of polystyrene or polyethylene having deposited thereon a thin film of tin oxide, chromium or aluminum. The polychromatic photoelectrophoretic material is thus sandwiched between surface of the tape 24 and the tape 38 at the recording station 10.

In a photoelectrophoretic imaging system, an image is formed from the imaging suspension by subjecting the suspension to an electric field while simultaneously exposing it to activating electromagnetic radiation such as visible light. In FIG. 1, an electric field is established by a source of potential shown to be a battery 44 having a positive terminal thereof coupled by a contact member 46 to the conductive surface 18 of the injection electrode 12. The conductive drum 20 of the blocking electrode is coupled to a negative terminal of the battery 44 through a sliding contact 48 and a common ground connection. A relatively positive potential is therefore established between the injection electrode and the blocking electrode.

A means is provided for projecting a plurality of light beams of different colors toward the record medium at the recording station 10. This means includes an equal plurality of optical channels each having a sensitive galvanometer coil and a reflective surface operatively coupled thereto for movement with the coil when an exciting signal is applied to the coil. A first channel includes a sensitive galvanometer coil 50 having terminals 52 and 54 to which an electrical signal is applied. The signal is derived from a source 56. A light source 58 for the oscillograph comprises a high intensity incandescent lamp or other form of lamp such as a low power arc lamp. An aperture plate 60 is provided having a plurality of apertures formed therein for transmitting through the plate an equal plurality of light beams. Focusing means 62 are provided for forming a light beam which is transmitted through one aperture in the plate 60 into a relatively narrow light beam. A color filtering means 64 for transmitting blue colored components of the light beam is disposed between the focusing means 62 and a reflective body 66 which is operatively coupled to the coil 50. The reflective means 66 comprises a body having a reflective surface or a prism and is arranged for reflecting the incident beam of light 68 toward the injection electrode 12. It is operatively coupled to the coil by mounting thereto as for example by cementing the surface to the coil as shown or alternatively, it is mechanically linked to the coil for movement therewith. In addition to the coil 50 and reflective means 66, the galvanometer includes the usual permanent magnet, spring loading and damping means, not shown. The details of this movement are well known and are described and illustrated beginning at page 469 of *Basic Electrical Measurements*, Melville B. Stout, Prentice Hall, N.Y., 1950. A reflected beam 70 is transmitted through the optically transparent injection electrode body and impinges upon a reflective body 72 which is positioned within the cylinder. This body reflects an incident light beam toward the recording station 10. As the amplitude of the signal applied to the coil 50 varies in magnitude, the coil 50 will rotate and cause deflection of the reflected beam 70 along the reflective surface 72 in a direction extending perpendicular to the plane of the paper as viewed in FIG. 1. The beam will therefore be traced across the width of the recording medium in accordance with the extent of its deflection and in proportion to the amplitude of the signal applied to coil 50. The reels 26 and 28 and the reels 40 and 42 cause the transport of the tapes 24 and 38 respectively through the recording station 10 and the deflected beam 70 therefore traces a wave form on the moving record medium.

In a similar manner, a second channel includes a galvanometer coil 80 having terminals 82 and 84 to which an input signal which is derived from a source 86 is applied. A lens arrangement 88 focuses that portion of the light beam extending through an associate aperture in the plate 60 into a relatively narrow beam and color filter 90 transmits those red components of the white light toward a reflective surface 92 which is operatively coupled to the coil 80. A red light beam 94 is incident upon this surface and is reflected toward the surface 72 and is deflected across the recording medium in accordance with the magnitude of the signal applied to the coil 80.

A third channel is also shown and includes a galvanometer coil 100 having input terminals 102 and 104 to which a signal from a source 106 is applied. A focusing lens 108 focuses the light beam from the source 48 into a narrow beam and a green filtering means 110 transmits green components of the white light. A reflective body 112 is operatively coupled to the coil 100 and, as described with respect to the blue and red channels, is operative when the signal amplitude is varied to reflect an incident beam 114 along the reflective surface 72.

In a polychromatic photoelectrophoretic recording system, the photosensitive particles are attracted to the injecting electrode and in accordance with one theory the particles exchange charge with the injecting electrode when exposed to light and migrate under the influence of the field through the liquid carrier to the blocking electrode. A negative image is thereby initially formed at a receiving surface of the blocking electrode. Transfer of the positive image is then subsequently accomplished by applying potential of reverse polarity between the blocking and injecting electrode. However, in a subtractive polychromatic system of the type illustrated in FIG. 1, the particles which migrate to the tape 38 will form a positive image in color on this tape. A negative image in color will remain on the tape 24. Accordingly, the take-up reel 42 will draw the positive record of the color traces associated with each channel through the station 10 and a waveform record of signal variations of the signals provided by the sources 56, 86 and 106 is thereby provided.

Figure 2:
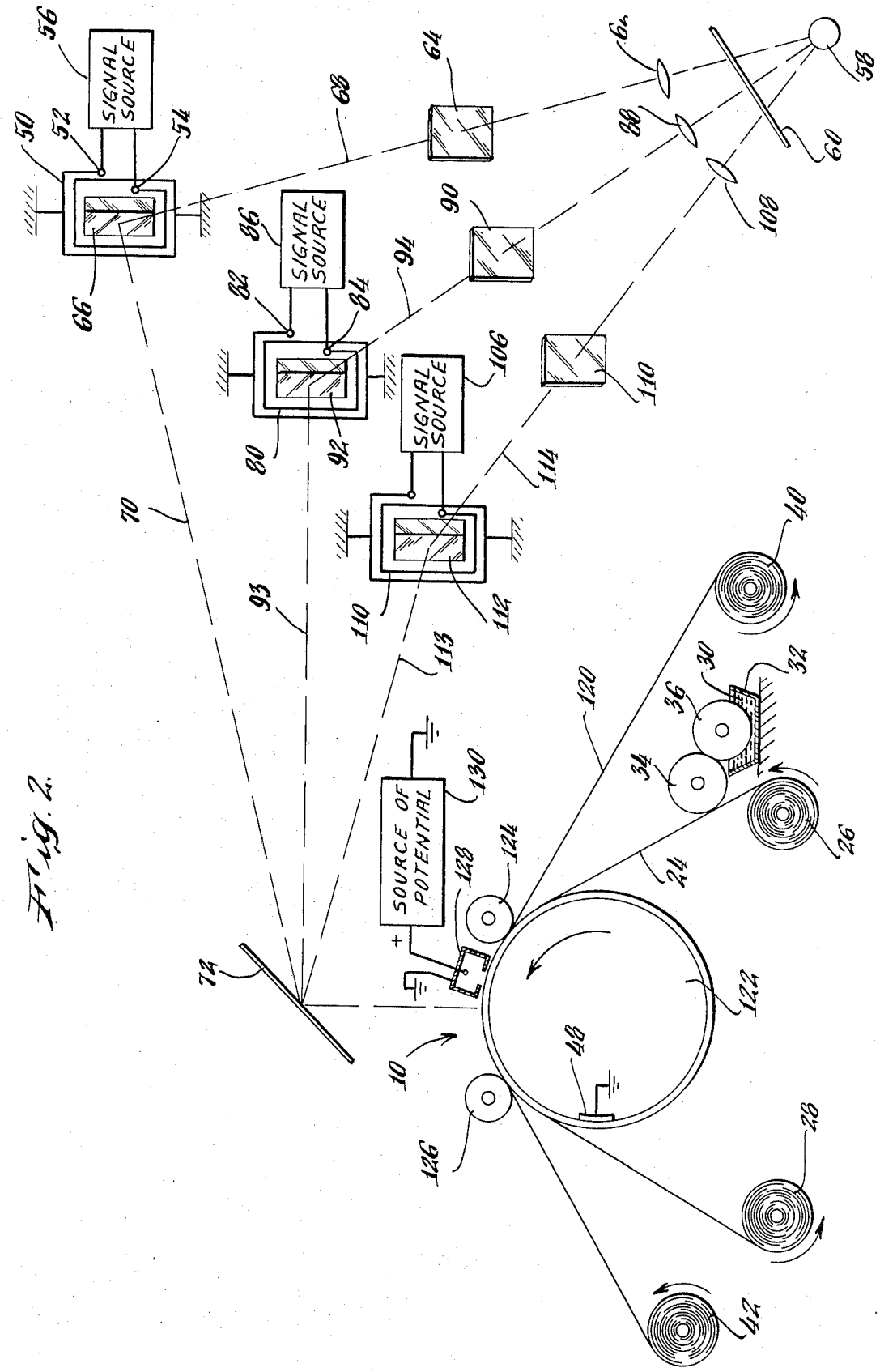
FIG. 2 is a schematic view of an alternative embodiment of the multi-channel oscillograph of this invention; and, FIG. 3 is a schematic view of another alternative embodiment of the multi-channel oscillograph of this invention.

An alternative embodiment of the invention is illustrated in FIG. 2 wherein those components performing functions similar to functions performed by components in FIG. 1 bear the same reference numerals. The polychromatic photoelectrophoretic multi-channel oscillograph of FIG. 2 employs a means for establishing a uniform electric charge upon a surface of an optically transparent tape 120 formed of an insulating material such as Mylar, polystyrene or polypropylene. The tape 120 and the coated tape 24 are transported over a conductive drum 122 and are conformed to the shape of the drum in the area of the recording station 10 by guide rollers 124 and 126. A potential gradient is established across the pigmented suspension by a means for establishing a relatively intense uniform charge on the tape 120 and a means 48 for establishing the drum 122 at ground potential. The charge is established on the tape 120 by corotron 128. As is well known, the corotron includes a corona wire 129 near the center of a tube or box which faces the surface to be charged. A high charging potential is applied to the wire from a source 130. The oscillograph of FIG. 2 operates in other respects in the same manner as that described with respect to FIG. 1.

FIG. 3 illustrates an alternative embodiment of a photoelectrophoretic recording oscillograph in accordance with this invention. Those elements of FIG. 3 which perform the functions similar to the functions perpared by elements shown in FIG. 1 bear the same reference numerals. An electrically conductive drum 140 is provided and has a surface 142 deposited thereon comprising a film of electrically insulating material. The drum is maintained at a relatively negative potential with respect to ground by a source of potential shown to be a battery 144, a contact shoe 146 which is in sliding contact with the surface of the drum and suitable connections for coupling the shoe to a negative terminal of the battery 144. The surface 142 is coated with a polychromatic photoelectrophoretic recording medium 30 of the type referred to hereinbefore by an applicator 36 which conveys the recording medium from the reservoir 32 to the surface 142. A web of material 148 comprising a transparent electrically conductive material such as aluminized Mylar or aluminized Tedlar is drawn from a supply reel 150 across the surface 142 in contact with the recording medium 30 and is taken up by a take-up reel 152. Rollers 154 and 156 are provided for establishing conformity between the web 148 and the surface 142 and for establishing contact with the recording medium at the station 10. The roller 150 is established at ground potential thereby maintaining the conductive web 148 at ground potential. An electric potential is thus established between the web and the conductive drum. Multi-channel polychromatic photoelectrophoretic recording, as described hereinbefore with respect to FIGS. 1 and 2, is thereby affected. A doctor blade 158 is provided for removing residual recording medium from the surface 142 prior to reapplication of the recording medium by the applicator 36.

There has thus been described an improved, polychromatic, photoelectrophoretic photorecording oscillograph which advantageously provides a plurality of traces which are readily resolved and can be associated with a related channel by virtue of the color of the trace. The use of the oscillograph for simultaneously recording multiple input signals is thus greatly enhanced.

While I have described the particular embodiments of my invention, various other modifications will occur to those skilled in the art without departing from the spirit of the invention and scope of the appended claims.

What is claimed is:

1. A multi-channel recording oscillograph comprising: a recording station having;

a blocking electrode, an injection electrode in operative proximity to said blocking electrode, means for transporting, in a first direction, between said injection and blocking electrodes, a polychromatic photoelectrophoretic medium for the receipt of images thereon, said injection electrode comprising an electrically conductive optically transparent body adapted to contact said polychromatic photoelectrophoretic medium whereby polychromatic images will be formed on said medium when struck by light; and an optical assembly for projecting, through said optically transparent body, a plurality of light beams along separate optical paths, said paths beginning at a source of illumination and terminating at said recording station at separate points along a line transverse to the first mentioned direction, said assembly including;

lens means along each optical path for focusing and projecting light rays from a source of illumination through said optically transparent body to said recording station, filter means along each optical path for rendering each light beam projected toward said recording station of a different color, a plurality of reflective bodies positioned along the optical path to redirect light from the source of illumination toward said recording station, an electrometer coil coupled to each said reflective bodies, a control means coupled to each said electrometer coil for applying electrical signals to each of said electrometer coils for causing activation of said coils and, consequently, individually oscillating each said reflective body a distance proportional to the magnitude of the signal applied thereto for causing deflection of said light beam along said optical path and, movement at said record medium whereby separate image traces may be created at said recording station in color and amplitude representative of the electrical signals applied to said coils.

* * * * *